US012120546B2

(12) United States Patent
Feng (10) Patent No.: US 12,120,546 B2
(45) Date of Patent: Oct. 15, 2024

(54) METHOD OF SWITCHING BETWEEN DATA CONNECTIONS FOR MOBILE COMMUNICATION DEVICES

(71) Applicant: Garena Online Private Limited, Singapore (SG)

(72) Inventor: Lusha Feng, Singapore (SG)

(73) Assignee: Garena Online Private Limited, Singapore (SG)

( * ) Notice: Subject to any disclaimer, the term of this patent is extended or adjusted under 35 U.S.C. 154(b) by 386 days.

(21) Appl. No.: 17/764,818

(22) PCT Filed: Dec. 10, 2021

(86) PCT No.: PCT/SG2021/050774
§ 371 (c)(1),
(2) Date: Mar. 29, 2022

(87) PCT Pub. No.: WO2022/235203
PCT Pub. Date: Nov. 10, 2022

(65) Prior Publication Data
US 2023/0079927 A1 Mar. 16, 2023

(30) Foreign Application Priority Data
May 3, 2021 (SG) .......................... 10202104533X (51) Int. Cl.
*H04W 28/02* (2009.01)
*H04W 28/10* (2009.01)
*H04W 76/15* (2018.01)

(52) U.S. Cl.
CPC ....... *H04W 28/0252* (2013.01); *H04W 28/10* (2013.01); *H04W 76/15* (2018.02)

(58) Field of Classification Search
CPC . H04W 28/0252; H04W 28/10; H04W 76/15; H04W 76/25; H04W 24/08; H04W 76/16; H04W 88/06; H04W 48/18
See application file for complete search history.

(56) References Cited

U.S. PATENT DOCUMENTS

2014/0171065 A1\* 6/2014 Graessley ............. H04W 76/19
455/426.1
2015/0373574 A1 12/2015 Gordon et al.
(Continued)

FOREIGN PATENT DOCUMENTS

CN 112004253 11/2020

*Primary Examiner* — Ayaz R Sheikh
*Assistant Examiner* — Tarell A Hampton
(74) *Attorney, Agent, or Firm* — David R. Stevens; Stevens Law Group (57) ABSTRACT

A method for switching between data connections for a mobile communication device is disclosed, the method comprising the steps of establishing both a cellular data connection and a Wi-Fi data connection between the mobile communication device and a server; and concurrently maintaining the cellular data connection and the Wi-Fi data connection. The method further comprises the steps of collecting monitoring data by concurrently monitoring a first ping of the cellular data connection and a second ping of the Wi-Fi data connection; using either the cellular data connection or the Wi-Fi data connection for data communication with the server at any one time; and collecting switching data, the switching data indicative of a frequency of switching. The method further comprises the step of determining at a predetermined time and based on the monitoring data and the switching data whether switching should be performed.

16 Claims, 4 Drawing Sheets

(56) References Cited

U.S. PATENT DOCUMENTS

| | | |
|---|---|---|
| 2017/0063699 A1* | 3/2017 | Kim .................... H04L 47/2491 |
| 2019/0150150 A1 | 5/2019 | Calin et al. |
| 2020/0137653 A1 | 4/2020 | Park et al. |
| 2020/0213360 A1 | 7/2020 | Ojha et al. |

* cited by examiner

METHOD OF SWITCHING BETWEEN DATA CONNECTIONS FOR MOBILE COMMUNICATION DEVICES

FIELD OF THE INVENTION

The invention pertains to data connections for mobile communication devices.

BACKGROUND

Mobile communication devices typically wirelessly connect to a server using either a Wi-Fi connection or a cellular connection. However, both of these connections are susceptible to instability and bandwidth fluctuations which can result in the connections "dropping" or "disconnecting". This can result in loss of connectivity and loss of data which is especially problematic for applications with high real-time requirements such as real-time online games, video calls, video conferences etc.

What is required is a novel solution which concurrently maintains data connections with a server via both a cellular network and a Wi-Fi network, and the ability to efficiently and effectively switch between these data connections based on which data connection has the superior connection speed (i.e. lower ping) and based on the switching history. Furthermore, other desirable features and characteristics will become apparent from the subsequent detailed description and the appended claims, taken in conjunction with the accompanying drawings and this background of the disclosure.

SUMMARY OF INVENTION

According to a first aspect of the invention, a method for switching between data connections for a mobile communication device is described, the method comprising the steps of establishing via a cellular network, a cellular data connection between the mobile communication device and a server; establishing via a Wi-Fi network, a Wi-Fi data connection between the mobile communication device and the server; and concurrently maintaining the cellular data connection and the Wi-Fi data connection. The method further comprises the steps of collecting monitoring data by concurrently monitoring a first ping of the cellular data connection and a second ping of the Wi-Fi data connection, the first ping and the second ping each being a weighted average of a series of ping values; using one of the cellular data connection and the Wi-Fi data connection for data communication with the server at any one time; and collecting switching data, the switching data indicative of a frequency of switching.

The method further comprises the step of determining at a predetermined time based on the monitoring data whether switching should be performed; determining based on the switching data whether switching should be performed by evaluating if the frequency of switching over a time period is within a switching threshold, wherein determining that based on the switching data that switching should not be performed will override any determination for switching made in relation to the monitoring data; and if it is determined that switching should be performed, performing switching to switch from the one of the cellular data connection and the Wi-Fi data connection, to another one of the cellular data connection and the Wi-Fi data connection, for data communication with the server.

Preferably, if the monitoring data indicates that the first ping is larger than a high ping threshold, and that the second ping is less or smaller than the high ping threshold, and that a difference between the first ping and the second ping is larger than a ping-delta threshold, it would be determined that based on the monitoring data, switching should be performed, and switching is performed to switch from the cellular data connection to the Wi-Fi data connection for data communication with the server.

Preferably, if the monitoring data indicates that the second ping is larger than a high ping threshold, and that the first ping is less or smaller than the high ping threshold, and that a difference between the first ping and the second ping is larger than a ping-delta threshold, it would be determined that based on the monitoring data, switching should be performed, and switching is performed to switch from the Wi-Fi data connection to the cellular data connection for data communication with the server.

Preferably, the high ping threshold is a ping value in the range of 100 to 300 ms; and the ping-delta threshold is a ping value in the range of 50 to 70 ms.

Preferably, if the monitoring data indicates that the first ping is larger than a severe ping threshold, and that the second ping is less or smaller than the first ping, it would be determined that based on the monitoring data, switching should be performed, and switching is performed to switch from the cellular data connection to the Wi-Fi data connection for data communication with the server.

Preferably, if the monitoring data indicates that the second ping is larger than a severe ping threshold, and that the first ping is less or smaller than the second ping, it would be determined that based on the monitoring data, switching should be performed, and switching is performed to switch from the Wi-Fi data connection to the cellular data connection for data communication with the server.

Preferably, the severe ping threshold is around 350 ms.

Preferably, the data communication with the server is for the purposes of playing an online game on the mobile communication device, and if the switching data indicates that the frequency of switching for a session of the online game will exceed a game session switching threshold, it would be determined that based on the switching data, switching should not be performed, and switching is not performed.

Preferably, the monitoring data is collected by sending heartbeat packets to the server.

Preferably, the cellular data connection is assigned a first port number and a first IP address, and the Wi-Fi data connection is assigned a second port number and a second IP address; and switching being performed results in assigning the second port number and the second IP address to the cellular data connection, and assigning the first port number and the first IP address to the Wi-Fi data connection.

According to a second aspect of the invention, a mobile communication device is described, the mobile communication device comprising a cellular module configured to establish via a cellular network, a cellular data connection with a server; a Wi-Fi module configured to establish via a Wi-Fi network, a Wi-Fi data connection with the server; a monitoring module configured to collect monitoring data by concurrently monitoring a first ping of the cellular data connection and a second ping of the Wi-Fi data connection, the first ping and the second ping each being a weighted average of a series of ping values; a communication module configured to use one of the cellular data connection and the Wi-Fi data connection for data communication with the server at any one time; and a switching module configured to collect switching data, the switching data indicative of a frequency of switching.

Wherein the cellular data connection and the Wi-Fi data connection are concurrently maintained and wherein the switching module is configured to determine at a predetermined time based on the monitoring data and the switching data whether switching should be performed; determine based on the switching data whether switching should be performed by evaluating if the frequency of switching over a time period is within a switching threshold, wherein determining that based on the switching data that switching should not be performed will override any determination for switching made in relation to the monitoring data; and if it is determined that switching should be performed, perform switching to switch from the one of the cellular data connection and the Wi-Fi data connection, to another one of the cellular data connection and the Wi-Fi data connection, for data communication with the server.

Preferably, if the monitoring data indicates that the first ping is larger than a high ping threshold, and that the second ping is less or smaller than the high ping threshold, and that a difference between the first ping and the second ping is larger than a ping-delta threshold; the switching module would determine that based on the monitoring data, switching should be performed and switch from the cellular data connection to the Wi-Fi data connection for data communication with the server.

Preferably, if the monitoring data indicates that the second ping is larger than a high ping threshold, and that the first ping is less or smaller than the high ping threshold, and that a difference between the first ping and the second ping is larger than a ping-delta threshold; the switching module would determine that based on the monitoring data, switching should be performed, and switch from the Wi-Fi data connection to the cellular data connection for data communication with the server.

Preferably, if the monitoring data indicates that the first ping is larger than a severe ping threshold, and that the second ping is less or smaller than the first ping; the switching module would determine that based on the monitoring data, switching should be performed and switch from the cellular data connection to the Wi-Fi data connection for data communication with the server.

Preferably, if the monitoring data indicates that the second ping is larger than a severe ping threshold, and that the first ping is less or smaller than the second ping; the switching module would determine that based on the monitoring data, switching should be performed and switch from the Wi-Fi data connection to the cellular data connection for data communication with the server.

Preferably, the data communication with the server is for the purposes of playing an online game on the mobile communication device, and if the switching data indicates that the frequency of switching for a session of the online game will exceed a game session switching threshold, the switching module would determine that based on the switching data, switching should not be performed, and switching is not performed.

Other aspects of the invention will become clearer from the following detailed description of some preferred embodiments thereof.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Skilled artisans will appreciate that elements in the figures are illustrated for simplicity and clarity and have not necessarily been depicted to scale. For example, the dimensions of some of the elements in the block diagrams or steps in the flowcharts may be exaggerated relative to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a method for switching between data connections for a mobile communication device, the method comprising the steps of establishing via a cellular network, a cellular data connection between the mobile communication device and a server; establishing via a Wi-Fi network, a Wi-Fi data connection between the mobile communication device and the server; and concurrently maintaining the cellular data connection and the Wi-Fi data connection.

The method further comprises the steps of collecting monitoring data by concurrently monitoring the ping of the cellular data connection (i.e. cellular_ping) and the ping of the Wi-Fi data connection (i.e. Wi-Fi_ping); and using either the cellular data connection or the Wi-Fi data connection for data communication with the server at any one time. The method further comprises the step of collecting switching data, the switching data indicative of a frequency of switching performed by the mobile communication device.

The method further comprises the step of determining at a predetermined time and based on the monitoring data and the switching data whether switching should be performed. If it is determined that switching should be performed, the method further comprises the step of performing switching to switch from the cellular data connection to the Wi-Fi data connection, or vice versa, for data communication with the server.

The method therefore teaches that the mobile communication device concurrently maintains two data connections to the server, one data connection via the cellular medium (i.e. cellular data connection), and the other data connection via the Wi-Fi medium (Wi-Fi data connection). Only one of the data connections is being used for data communication with the server at any one time and that data connection is referred to as the "active data connection". The data connection not being currently used is referred to as the "backup data connection".

The method also teaches concurrently monitoring the ping of the cellular data connection (cellular_ping) and the ping of the Wi-Fi data connection (Wi-Fi_ping) to collect monitoring data. Ping or latency, as clearly understood by the skilled person, is the time taken for a small data set to be transmitted from the mobile communication device to the server on the internet, and then back to the mobile communication device.

The determination of whether switching from the active data connection to the backup data connection should be performed is done at a pre-determined or specified time (for example, at a regular polling interval), and based upon on the monitoring data and the switching data gathered up to that point in time. For example, assuming that the active data connection is the Wi-Fi data connection and the backup data connection is the cellular data connection, if the monitoring data indicates that Wi-Fi_ping is larger than cellular_ping, and if the switching data indicates that the frequency of switching is within an allowable limit, it may be determined that switching should be performed. Performing switching would then result in the cellular data connection now being the active data connection and being used for data communication with the server, while the Wi-Fi data connection will be regulated to the backup data connection and be idle and not receive nor transmit any data, until such time that switching is performed again.

In another example, assume that the active data connection is the cellular data connection and the backup data connection is the Wi-Fi data connection. If the monitoring data indicates that cellular_ping is larger than Wi-Fi_ping, and if the switching data indicates that the frequency of switching is within an allowable limit, it may be determined that switching should be performed. Performing switching would result in the Wi-Fi data connection now being the active data connection and being used for data communication with the server, while the cellular data connection will be regulated to the backup data connection and be idle and not receive nor transmit any data, until such time that switching is performed again.

Though it may be less cost effective to constantly maintain dual data connections to the server, with one of the data connections being idle and unutilized at any one time, the advantage is the provision of guarding against the scenario where the active data connection suddenly deteriorates to levels of very high ping, which will severely impact the data communication with the server. For example, if the data communication with the server is for playing an online game on the mobile communication device, the high ping experienced by the active data connection will adversely affect the playability of the online game as well as the user experience. In such an event, the idle or back-up connection, which would have a lower ping, can instantaneously relieve the active data connection of data communication duties, thereby avoiding or mitigating any windows in which there is a loss of data communication with the server.

One of the main considerations of the invention is to avoid unnecessary switching to the backup data connection when it does not garner much improvement over the active data connection. This is because switching invariably consumes CPU cycles and computational resources of the mobile communication device. Therefore, if switching from the active data connection to the backup data connection only yields marginal improvement in the connection speed or ping, it may not be worthwhile to perform switching in that instance.

In embodiments, one way to avoid unnecessary switching is to use a high ping threshold variable and a ping-delta threshold variable to gauge if switching should be performed. The high ping threshold is a ping value which is considered to be high and undesirable. A data connection which has a ping greater than the high ping threshold would be experiencing delays and lags. Examples of high ping threshold can be around 100 ms, 150 ms, 200 ms, 250 ms or 300 ms, or any ping value within the range of 100 to 300 ms.

The ping-delta threshold is the minimum difference between the ping of two data connections (i.e. difference in connection speed) that will not warrant a switch. If the difference between the ping of the active data connection and the ping of the backup data connection exceeds the ping-delta threshold, it may be worthwhile performing the switch as the improvement in connection speed or ping would be significant enough to justify the switch. Conversely, if the difference between the ping of the active data connection and the ping of the backup data connection does not exceed the ping-delta threshold, it may not be worthwhile performing the switch as the improvement in ping or connection speed would not be significant enough to justify the switch. Examples of ping-delta threshold can be around 50 ms, 60 ms or 70 ms, or any ping value within the range of 50-70 ms.

Therefore, in applying the two variables together, if the ping of the active data connection is larger than the high ping threshold, and the ping of the backup data connection is lower than the high ping threshold, and if the difference between the ping of the active data connection and the ping of the backup data connection exceeds the ping-delta threshold, it will be determined that switching should be performed. In other words, conditions are set in relation to the two variables to ensure that switching to the backup data connection is done only when it yields significant improvement in the ping or connection speed, thereby avoiding or mitigating unnecessary switching.

Therefore, assuming that the Wi-Fi data connection is the active data connection, and if the monitoring data indicates that Wi-Fi_ping is larger than the high ping threshold, and that cellular_ping is lower than the high ping threshold, and that the difference between cellular_ping and Wi-Fi_ping is larger than the ping-delta threshold, it will be determined that switching should be performed. After switching is performed, cellular data connection will now be the active data connection which is being used for data communication with the server, while the Wi-Fi data connection will be regulated to the backup data connection.

Likewise, assuming that the cellular data connection is the active data connection, and if the monitoring data indicates that cellular_ping is larger than the high ping threshold, and that Wi-Fi_ping is lower than the high ping threshold, and that the difference between cellular_ping and Wi-Fi_ping is larger than the ping-delta threshold, it will be determined that switching should be performed. After switching is performed, Wi-Fi data connection will now be the active data connection which is being used for data communication with the server, while the cellular data connection will be regulated to the backup data connection.

In instances where the ping of the active data connection is extremely high, it is logical to switch to the backup data connection even when the ping of the backup data connection is only marginally better. The rationale is that when the data connection has deteriorated to such a poor level, any improvement in the ping (even when it is marginal) would be welcomed at that point. In practical situations, this marginal improvement would give the player the best chance to play the online game, or that in the case of a video call, at least some portions of the video call may still be able to be seen or heard.

In such embodiments, a severe ping threshold is used as a variable. The severe ping threshold is a ping value which is considered to be very high and extremely undesirable. A data connection which has a ping greater than the severe ping threshold would be experiencing constant and lengthy delays and significant lags. Any video call or any online gameplay on such a slow data connection would be heavily compromised. Examples of severe ping threshold can be 350 ms, around 350 ms, or higher than 350 ms.

Therefore, if the ping of the active data connection exceeds the severe ping threshold, so long as the ping of the backup data connection is lower than the ping of the active data connection, it will be determined that switching should be performed. Notably, there is no comparison with the ping-delta threshold variable as per previously described embodiments. This is because in scenarios where the data connection is extremely poor and has reached severe ping threshold levels, the primary objective would be to provide the best data connection available, and avoiding unnecessary switching will be of a secondary concern at that point.

Therefore, assuming that the Wi-Fi data connection is the active data connection, and if the monitoring data indicates that Wi-Fi_ping is larger than the severe ping threshold, and that cellular_ping is smaller than W-Fi_ping, it will be determined that switching should be performed. After switching is performed, cellular data connection will now be the active data connection which is being used for data communication with the server, while the Wi-Fi data connection will be regulated to the backup data connection.

Likewise, assuming that the cellular data connection is the active data connection, and if the monitoring data indicates that cellular_ping is larger than the severe ping threshold, and that Wi-Fi_ping is smaller than cellular_ping, it will be determined that switching should be performed. After switching is performed, Wi-Fi data connection will now be the active data connection which is being used for data communication with the server, while the cellular data connection will be regulated to the backup data connection.

If switching occurs frequently, and especially over a short period of time, this may suggest that both the Wi-Fi network and the cellular network are not stable and are fluctuating wildly. Switching during these periods may have limited benefit as the data connections are just too unstable and fluctuate too much to provide reliable data communication with the server. In embodiments, one way to guard against this scenario is to curb or limit the number of times switching can be done over a time period.

In embodiments, a switching threshold variable is used to gauge whether the number of times in which switching has been performed has become too excessive. The switching threshold could be in relation to a time period. The switching threshold can be the maximum number of times in which switching can be performed for the time period before it is deemed too excessive. For example, the switching threshold can be five times for a time period of 30 seconds. A counter can be used to count the number of times switching has been performed for the time period.

Therefore, if the switching data indicates that the frequency of switching over the time period will exceed the switching threshold, it will be determined that switching should not be performed. In embodiments, this determination that switching should not be performed based on the switching data will override any determination for switching made in relation to the monitoring data.

In embodiments, if the active data connection is being used to play an online game, a game session switching threshold variable can be used to gauge whether the number of times in which switching has been performed for that game session has become too excessive. A counter can be used to count the number of times switching has been performed for a particular game session.

Therefore, if the switching data indicates that the frequency of switching for a session of the online game will exceed the game session switching threshold, it will be determined that switching should not be performed. In embodiments, this determination that switching should not be performed based on the switching data will override any determination for switching made in relation to the monitoring data.

Another one of the main considerations of the invention is to avoid and mitigate the impact of the occasional fluctuations of the Wi-Fi network and cellular network. What this means is that sometimes even when the recent or latest ping of the active data connection is high, it may be premature to switch to the backup data connection. This is because the recent high ping may only be temporary, and can be a result of fluctuations. The connection speed of the active data connection may eventually recover and settle down to a lower ping. Therefore, in consideration of this, in embodiments, a weighted average of a series of ping values is used in the determination of whether switching should be performed.

Figure 1:
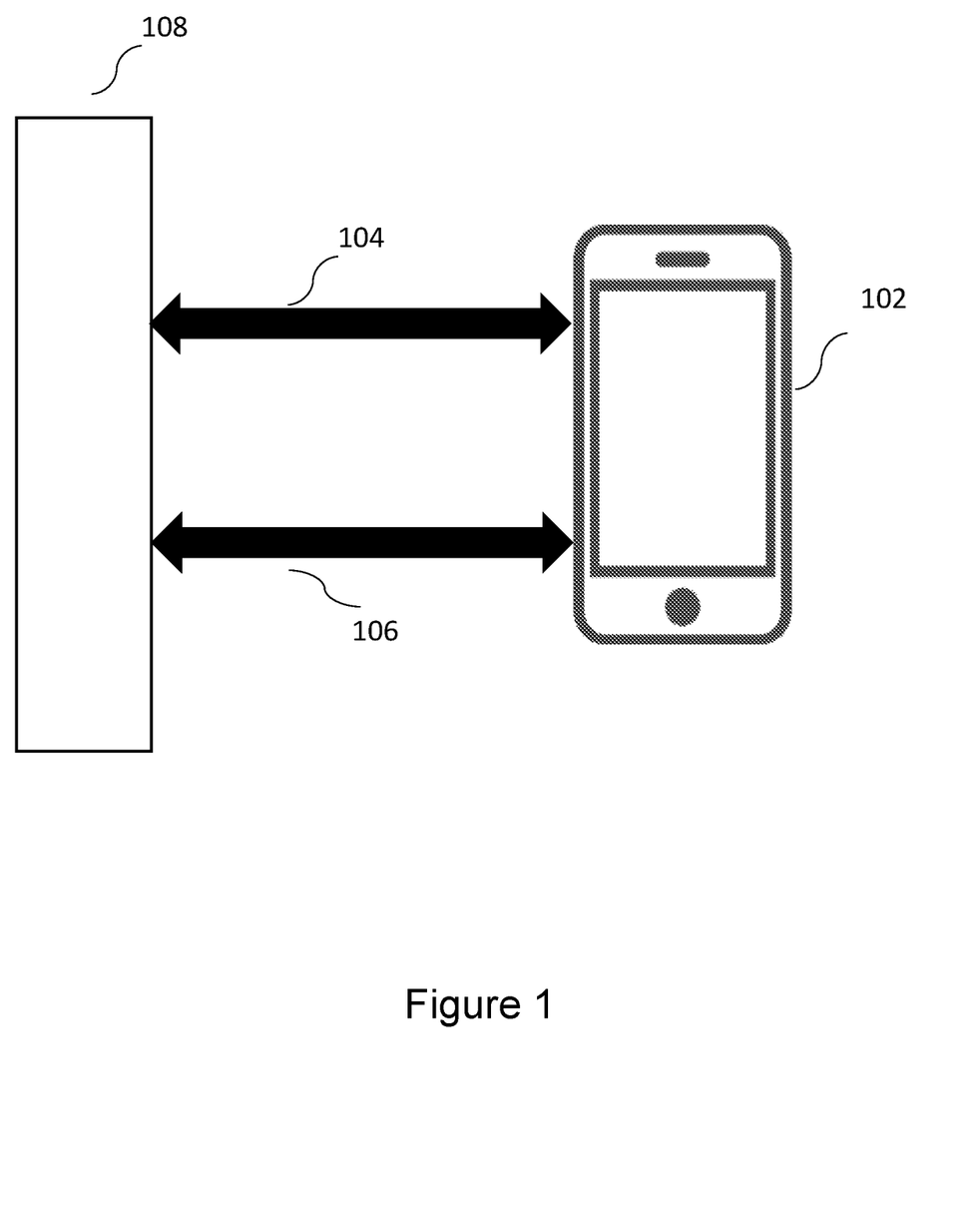
FIG. 1 shows a mobile communication device, which is capable of switching between data connections, in accordance with certain embodiments.

FIG. 1 shows mobile communication device 102, which is capable of switching between data connections, in accordance with certain embodiments. Mobile communication device 102 can send data to and receive data from server 108 via both cellular data connection 104 and Wi-Fi data connection 106.

Figure 2:
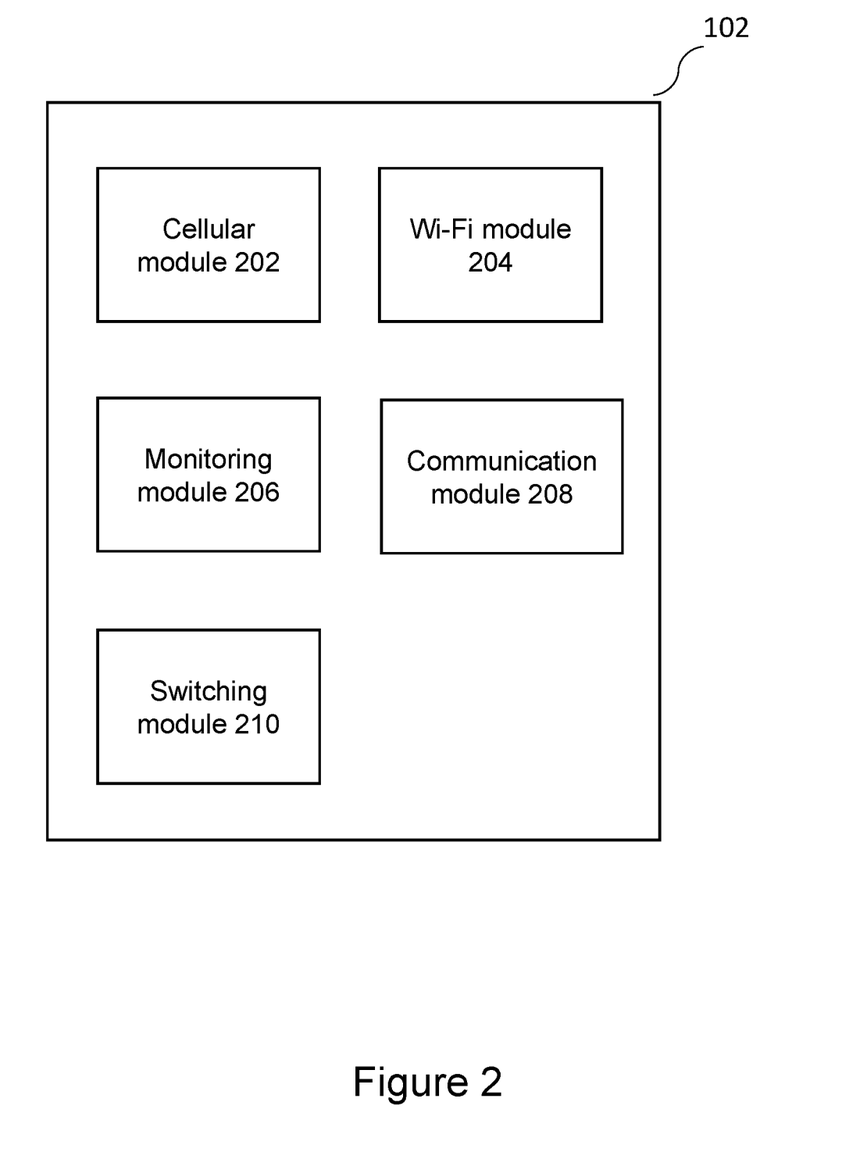
FIG. 2 shows the modules of a mobile communication device, which facilitates the switching between data connections, in accordance with certain embodiments.

FIG. 2 shows the modules of mobile communication device 102, which facilitates switching between cellular data connection 104 and Wi-Fi data connection 106, in accordance with certain embodiments. Mobile communication device 102 can comprise cellular module 202. Cellular module 202 can comprise the necessary hardware and software to establish via a cellular network, cellular data connection 104 with server 108. Mobile communication device 102 can also comprise Wi-Fi module 204. Wi-Fi module 204 can comprise the necessary hardware and software to establish via a Wi-Fi network, Wi-Fi data connection 106 with server 108.

Mobile communication device 102 can also comprise monitoring module 206. Monitoring module 206 can comprise the necessary hardware and software to collect monitoring data by concurrently monitoring the ping of cellular data connection 104 (i.e. cellular_ping) and the ping of Wi-Fi data connection 106 (i.e. Wi-Fi_ping). Monitoring module 206 can also comprise the necessary hardware and software to store and retrieve the collected monitoring data.

Mobile communication device 102 can also comprise communication module 208. Communication module 208 can comprise the necessary hardware and software to use either cellular data connection 104 or Wi-Fi data connection 106 at any one time, for data communication with server 108. The data connection being used for data communication with server 108 will be the active data connection, while the data connection not being used for data communication with server 108 will be the backup data connection.

Mobile communication device 102 can also comprise switching module 210. Switching module 210 can comprise the necessary hardware and software to collect switching data, the switching data indicative of a frequency of switching. Switching module 210 can also comprise the necessary hardware and software to store and retrieve the collected switching data.

Switching module 210 can also comprise the necessary hardware and software to determine at a predetermined time and based on the monitoring data and the switching data whether switching should be performed. If switching module 210 determines that switching should be performed, switching module 210 can also comprise the necessary hardware and software to perform switching to switch from cellular data connection 104 to Wi-Fi data connection 106, or vice versa, for data communication with the server.

Figure 3:
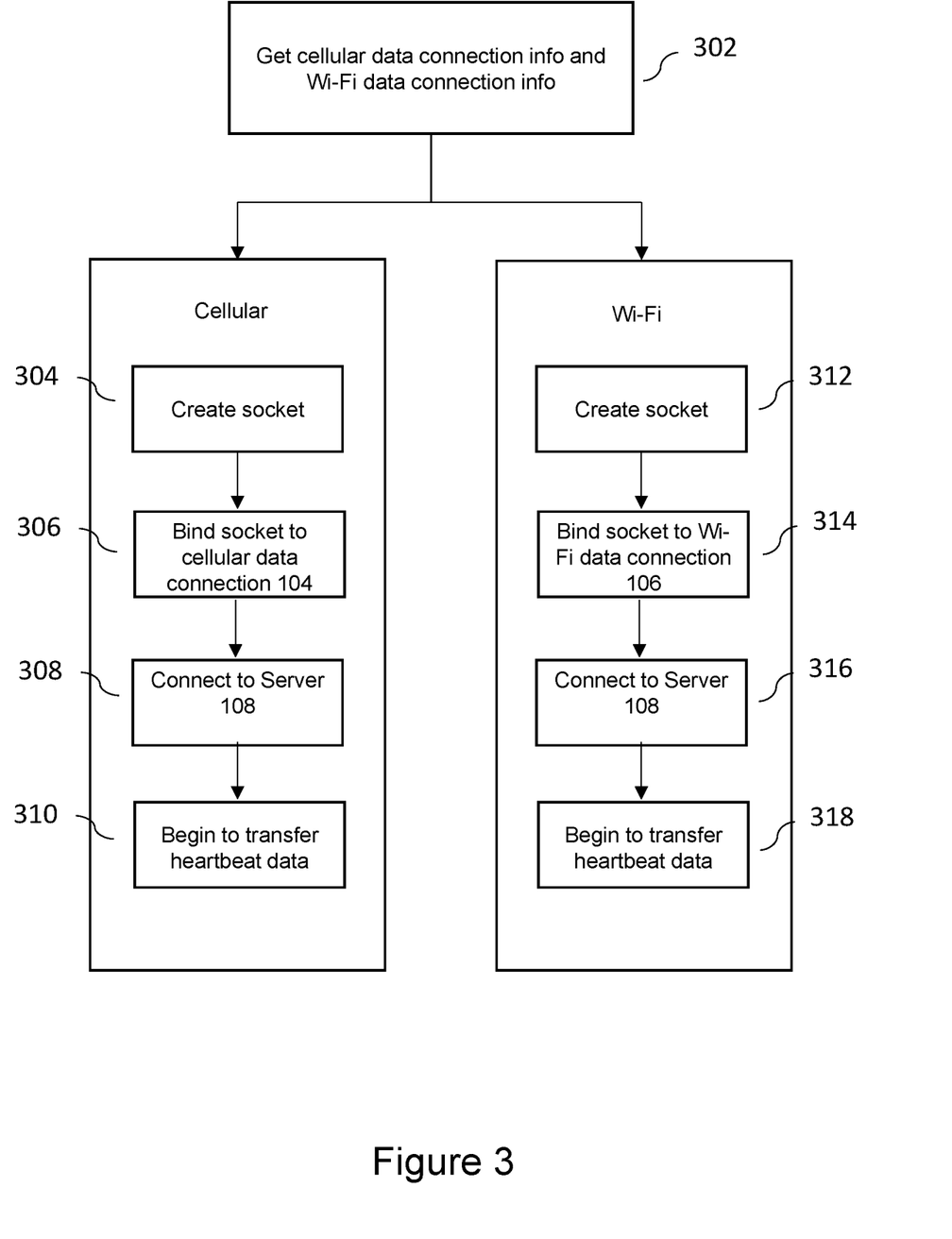
FIG. 3 depicts a flowchart that describes the steps taken by a mobile communication device to establish a cellular data connection and a Wi-Fi data connection with a server.

FIG. 3 depicts a flowchart that describes the steps performed by mobile communication device 102 to establish cellular data connection 104 and Wi-Fi data connection 106 with server 108.

In step 302, mobile communication device 102 obtains cellular data connection info and Wi-Fi data connection info according to known techniques in the art.

In step 304, a first socket is created with a first Internet Protocol (IP) address and a first port number.

In step 306, the first socket is bound to cellular data connection 104.

In step 308, mobile communication device 102 connects to server 108 using cellular data connection 104.

In step 310, mobile communication device 102 begins to transmit heartbeat data to server 108 via cellular data connection 104.

In step 312, a second socket is created with a second Internet Protocol (IP) address and a second port number.

In step 314, the second socket is bound to Wi-Fi data connection 106.

In step 316, mobile communication device 102 connects to server 108 using Wi-Fi data connection 106.

In step 318, mobile communication device 102 begins to transmit heartbeat data to server 108 via Wi-Fi data connection 106.

Figure 4:
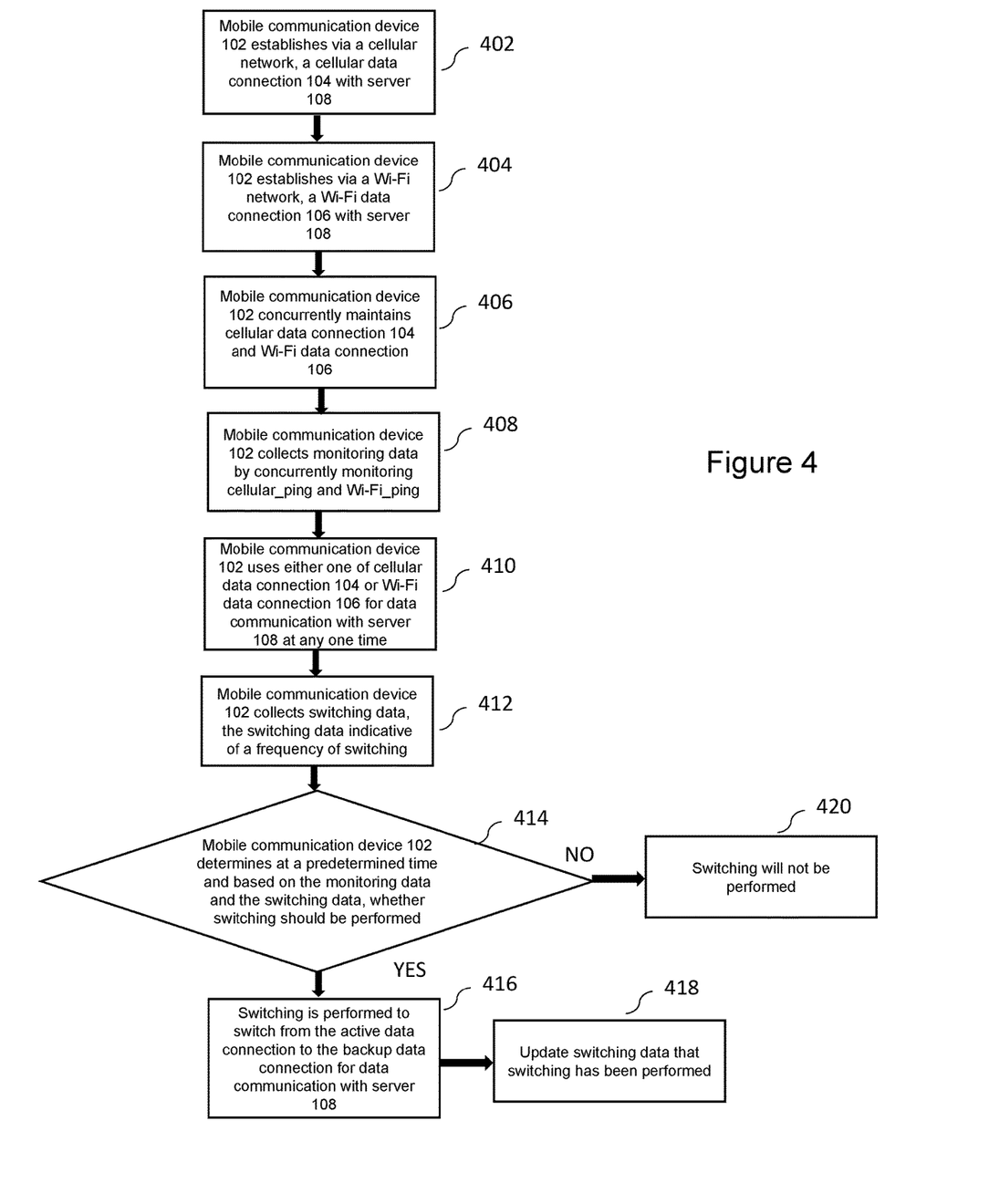
FIG. 4 depicts a flowchart that shows a method for switching between data connections for a mobile communication device, in accordance with certain embodiments.

FIG. 4 depicts a flowchart that shows a method for switching between data connections for mobile communication device 102, in accordance with certain embodiments.

In step 402, mobile communication device 102 establishes via a cellular network, a cellular data connection 104 with server 108.

In step 404, mobile communication device 102 establishes via a Wi-Fi network, a Wi-Fi data connection 106 with server 108.

In step 406, mobile communication device 102 concurrently and simultaneously maintains cellular data connection 104 and Wi-Fi data connection 106.

In step 408, mobile communication device 102 collects monitoring data by concurrently monitoring a ping of cellular data connection 104 (i.e. cellular_ping) and a ping of Wi-Fi data connection 106 (i.e. Wi-Fi_ping). Cellular_ping can be obtained by mobile communication device 102 sending heartbeat packets via cellular data connection 104 to server 108. Wi-Fi_ping can be obtained by mobile communication device 102 sending heartbeat packets via Wi-Fi data connection 106 to server 108.

Cellular_ping can be the latest or the most recent ping value obtained from cellular data connection 104. Wi-Fi_ping can be the latest or the most recent ping value obtained from Wi-Fi data connection 106. Alternatively, cellular_ping can be a weighted average of a series of ping values obtained from cellular data connection 104, while Wi-Fi_ping can be a weighted average of a series of ping values obtained from Wi-Fi data connection 106. For example, for the following ping values $P_0, P_1, \ldots P_n$ obtained at times $T_0, T_1, \ldots T_n$ respectively, a weighted average of a series of ping values can be an average of the ping values:

$$\text{Weighted average} = \frac{P_0 + P_1 \ldots P_n}{n+1}$$

As will be explained in the later paragraphs, using a weighted average of a series of ping values, instead of the recent ping value, when ascertaining whether to switch, can guard against sudden or drastic fluctuations in the network condition.

In step 410, mobile communication device 102 uses either one of cellular data connection 104 or Wi-Fi data connection 106 for data communication with server 108 at any one time. The data connection being used for data communication with server 108 will be the active data connection, while the data connection not being used for data communication with server 108 will be the backup data connection.

In embodiments, for the purposes of initialization, mobile communication device 102 can select the data connection which has the lower ping as the active data connection. For example, at the outset, if cellular_ping is lower or less than Wi-Fi_ping, cellular data connection 104 can be selected as the active data connection. Similarly, at the outset, if Wi-Fi_ping is lower or less than cellular_ping, Wi-Fi data connection 104 can be selected as the active data connection.

In step 412, mobile communication device 102 collects switching data, the switching data indicative of a frequency of switching. The switching data can comprise the number of times in which switching had been performed over a time period. This can be implemented via a counter synchronized with a timer which will increment every time switching is performed over a time period.

In step 414, mobile communication device 102 determines at a predetermined time and based on the monitoring data and the switching data, whether switching should be performed. The determination of whether switch should be performed, can be made at a pre-determined or a specified time. For example, the determination can be made at a regular polling interval.

Assuming that the active data connection is Wi-Fi data connection 106 and the backup data connection is cellular data connection 104, if the monitoring data indicates that Wi-Fi_ping is larger than cellular_ping, and the switching data indicates that the frequency of switching over the time period does not exceed an allowable limit, it may be determined that switching should be performed. In another example, assuming that the active data connection is cellular data connection 104 and the backup data connection is Wi-Fi data connection 106, if the monitoring data indicates that cellular_ping is larger than Wi-Fi_ping, and the switching data indicates that the frequency of switching over the time period does not exceed the allowable limit, it may be determined that switching should be performed.

In step 416, if mobile communication device 102 determines that switching should be performed, switching is then performed to switch from the active data connection to the backup data connection for data communication with server 108. In performing the switch, the IP addresses and the ports of the active data connection and the backup data connection will be swapped. For example, assuming that prior to the switch, the active data connection is assigned a first port number and a first IP address, and the backup data connection is assigned a second port number and a second IP address. As a result of the switching being performed, the second port number and the second IP address will now be assigned to the backup data connection (now the current active data connection), and the first port number and the first IP address will now be assigned to the active data connection (now the current backup data connection).

Therefore, assuming that the active data connection is Wi-Fi data connection 106 and the backup data connection is cellular data connection 104, switching will result in the second port number and the second IP address now being assigned to cellular data connection 104, and the first port number and the first IP address now being assigned to Wi-Fi data connection 106. If the purpose for the data communication with server 108 is for playing an online game, after switching, mobile communication device 102 can send a handshake packet to server 108. The handshake packet can comprise a game session identifier, the second port number and the second IP address. Server 108 receives the handshake packet and updates that the game session identifier corresponds to the second port number and the second IP address and data communication with mobile communication device 102 resumes via cellular data connection 104.

In step 418, mobile communication device 102 updates the switching data that switching has been performed. For example, the counter in relation to the time period can be incremented to reflect that the switching has been performed during the time period.

In step 420, if mobile communication device 102 determines that switching should not be performed, switching will not be performed.

The method therefore teaches that mobile communication device 102 concurrently and simultaneously, maintains and monitors, two data connections to server 108, cellular data connection 104 and Wi-Fi data connection 106. The method teaches making regular and timely determinations to switch depending on which one of the data connections is capable of providing the better performance at that point in time.

Though it may be less cost effective to constantly maintain dual data connections to server 108, with one of the data connections being idle and unutilized at any one time, the advantage is the provision of guarding against the scenario that the active data connection suddenly deteriorates to levels of very high ping, which will severely impact the data communication between mobile communication device 102 and server 108. For example, if the data communication with server 108 is for playing an online game on mobile communication device 102, the high ping of the active data connection will adversely affect the playability of the online game and the user experience. In such an event, the idle or back-up connection which would have a lower and thus superior ping, can instantaneously relieve the active data connection of data communication duties, thereby avoiding or mitigating any windows where there is loss of data communication with server 108.

One of the main considerations of the invention is to avoid unnecessary switching to the backup data connection when it does not garner much improvement over the active data connection. This is because switching invariably consumes CPU cycles and computational resources of mobile communication device 102. Therefore, if switching to the backup data connection only yields marginal improvement in the ping or connection speed, it may not be worthwhile to perform switching in that instance.

In embodiments, one way to avoid unnecessary switching is to use a high ping threshold variable and a ping-delta threshold variable to gauge if switching should be performed. The high ping threshold is a ping value which is considered to be high and undesirable. A data connection which has a ping greater than the high ping threshold would be experiencing delays and lags. Examples of high ping threshold can be 100 ms, 150 ms, 200 ms, 250 ms or 300 ms, or any ping value within the range of 100 to 300 ms.

The ping-delta threshold is the minimum difference between the ping of two data connections that will not warrant a switch. Therefore, if the difference between the ping of the active data connection and the ping of the backup data connection exceeds the ping-delta threshold, it may be worthwhile performing the switch as the improvement in ping or connection speed would be significant enough to justify the switch. Conversely, if the difference between the ping of the active data connection and the ping of the backup data connection does not exceed the ping-delta threshold, it may not be worthwhile performing the switch as the improvement in ping or connection speed may not be significant enough to justify the switch. Examples of ping-delta threshold can be 50 ms, 60 ms or 70 ms, or any ping value within the range of 50-70 ms.

Therefore, in embodiments, the determination of whether switching should be performed as per step 414 applies the two variables together, such that if the monitoring data indicates that the ping of the active data connection is larger than the high ping threshold, and that the ping of the backup data connection is lower than the high ping threshold, and that the difference between the ping of the active data connection and the ping of the backup data connection exceeds the ping-delta threshold, it will be determined that switching should be performed. In other words, conditions are set in relation to the two variables to ensure that switching to the backup data connection is done only when it yields significant improvement in the ping or connection speed, thereby avoiding or mitigating unnecessary switching.

In instances where the ping of the active data connection is extremely high, it may make sense to switch to the backup data connection even when the ping of the backup data connection is only marginally better than the active data connection. The rationale is that when the data connection has deteriorated to such a poor level, any improvement in the ping (even when it is marginal) would be welcomed at that point. In practical situations, this marginal improvement would give the player the best chance to play the online game, or that in the case of a video call, at least some portions of the video call may still be able to be seen or heard.

In such embodiments, a severe ping threshold is used as a variable. The severe ping threshold is a ping value which is considered to be very high and extremely undesirable. A data connection which has a ping greater than the severe ping threshold would be experiencing constant and lengthy delays and significant lags. Any video call or any online gameplay on such a slow data connection would be heavily compromised. Examples of severe ping threshold can be 350 ms, around 350 ms or higher.

Therefore, in embodiments, the determination of whether switching should be performed as per step 414 applies this variable such that if the ping of the active data connection exceeds the severe ping threshold, so long as the ping of the backup data connection is lower than the ping of the active data connection, it will be determined that switching should be performed. Notably, there is no comparison with the ping-delta threshold variable as per previously described embodiments. This is because in scenarios where the data connection is extremely poor and has reached severe ping threshold levels, the primary objective would be to provide the best data connection available, and avoiding unnecessary switching will be of secondary concern at that point.

If switching occurs frequently, and especially over a short period of time, this may suggest that both the Wi-Fi network and the cellular network are not stable and are fluctuating wildly. Switching during these periods may have limited benefit as the data connections are just too unstable and fluctuate way too much to provide reliable data communication with server 108. One way to guard against this scenario is to curb or limit the frequency of switching or the number of times switching can be done over a time period.

Therefore, in embodiments, the determination of whether switching should be performed as per step 414 applies the switching threshold variable to gauge whether the number of times in which switching has been performed has become too excessive. The switching threshold could be in relation to a time period. The switching threshold can be the maximum number of times switching can be performed for the time period before it is deemed too excessive. For example, the switching threshold can be five times for a time period of 30 seconds. A counter can be used to count the number of times switching has been performed for the time period.

Therefore, if the switching data indicates that the frequency of switching over the time period will exceed the switching threshold, it will be determined that switching should not be performed. In embodiments, this determination that switching should not be performed based on the switching data will override any determination for switching made in relation to the monitoring data.

In embodiments, if the active data connection is being used to play an online game, a game session switching threshold variable can be used to gauge whether the number of times in which switching has been performed for that game session has become too excessive. A counter can be used to count the number of times switching has been performed for a particular game session.

Therefore, if the switching data indicates that the frequency of switching for a session of the online game will exceed the game session switching threshold, it will be determined that switching should not be performed. In embodiments, this determination that switching should not be performed based on the switching data will override any determination made in relation to the monitoring data.

Another one of the main considerations of the invention is to avoid and mitigate the impact of the occasional fluctuations of the Wi-Fi and cellular networks. What this means is that sometimes even when the recent or the latest ping of the active data connection is high, it may be premature to switch to the backup data connection. This is because the recent high ping may be temporary, and can be a result of fluctuations. The connection speed of the active data connection may eventually recover and settle down to a lower ping. Therefore, in consideration of this, in embodiments, the ping of the active data connection and the backup data connection being considered is the weighted average of a series of ping values i.e. weighted_cellular_ping and weighted_Wi-Fi_ping as mentioned in step 408.

In embodiments, the determination of whether switching should be performed as per step 414 is based on weighted_cellular_ping and weighted_Wi-Fi_ping.

Weighted_cellular_ping and weighted_Wi-Fi_ping can be an average of a series of ping values of cellular data connection 104 and Wi-Fi data connection 106 respectively:

$$\text{Weighted\_cellular\_ping} = \frac{P_0 + P_1 \ldots P_n}{n+1}$$

$$\text{Weighted\_Wi-Fi\_ping} = \frac{P_0 + P_1 \ldots P_n}{n+1}$$

For example, assume that the active data connection is Wi-Fi data connection 106 and the backup data connection is cellular data connection 104. Weighted_cellular_ping can be an average of a series of five ping values obtained from cellular data connection 104. Weighted_Wi-Fi_ping can be an average of a series of five ping values obtained from Wi-Fi data connection 106.

Therefore, if the monitoring data indicates that weighted_Wi-Fi_ping is larger than high ping threshold, and that weighted_cellular_ping is lower than high ping threshold, and that the difference between weighted_cellular_ping and weighted_Wi-Fi_ping is larger than ping-delta threshold, it will be determined that switching to cellular data connection 104 should be performed.

In another example, if the monitoring data indicates that weighted_Wi-Fi_ping is larger than severe ping threshold, and that weighted_cellular_ping is smaller than weighted-_Wi-Fi_ping, it will be determined that switching to cellular data connection 104 should be performed.

In embodiments, both the recent ping and the weighted average of a series of ping values can be used in combination, in the determination of whether switching should be performed as per step 414. For example, assume that the active data connection is Wi-Fi data connection 106 and the backup data connection is cellular data connection 104. Recent_cellular_ping can be the most recent ping value obtained from cellular data connection 104 and recent_Wi-Fi ping can be the most recent ping value obtained from Wi-Fi data connection 106.

Weighted_cellular_ping can be an average of a series of five ping values obtained from cellular data connection 104. Recent_cellular_ping may or may not be one of these five ping values. Weighted_Wi-Fi_ping can be an average of a series of five ping values obtained from Wi-Fi data connection 106. Recent_Wi-Fi_ping may or may not be one of these five ping values.

If the monitoring data indicates that both recent_Wi-Fi_ping and weighted_Wi-Fi_ping are larger than high ping threshold, and that both recent_cellular_ping and weighted_cellular_ping are lower than high ping threshold, and that the difference between recent_cellular_ping and recent_Wi-Fi_ping as well as the difference between weighted_cellular_ping and weighted_Wi-Fi_ping are both larger than ping-delta threshold, it will be determined that switching to cellular data connection 104 should be performed.

Failure in any one of the conditions may result in the determination that switching should not be performed. For example, if recent_Wi-Fi ping is larger than high ping threshold but weighted_Wi-Fi_ping is lower than high ping threshold, mobile communication device 102 may determine that the high value of recent_Wi-Fi ping could just be the result of a temporary fluctuation in the Wi-Fi network, and conclude that Wi-Fi data connection 106 is in fact stable and has acceptable connection speed, and thus not perform the switch to cellular data connection 104.

In another example, if the monitoring data indicates that both recent_Wi-Fi_ping and weighted_Wi-Fi_ping are larger than severe ping threshold, and that recent_cellular_ping is smaller than recent_Wi-Fi_ping, and that weighted_cellular_ping is smaller than weighted-_Wi-Fi_p- ing, it will be determined that switching to cellular data connection 104 should be performed.

Failure in any one of the conditions may result in the determination that switching should not be performed. For example, if recent_Wi-Fi_ping is larger than severe ping threshold but weighted_Wi-Fi_ping is lower than severe ping threshold, mobile communication device 102 may determine that the extremely high value of recent_Wi-Fi ping could just be the result of a temporary fluctuation in the Wi-Fi network, and conclude that the ping of Wi-Fi data connection 106 has not deteriorated to the point that warrants the switch to cellular data connection 104.

Although it has been described throughout the specifications that the two data connections are a data connection via the Wi-Fi medium and a data connection via the cellular medium, the skilled person would appreciate that other mediums are also possible. The crucial point is that the two data connections are via different mediums, such that in the event that one data connection suffers from poor connectively, the other data connection should not also be so severely impacted and therefore provide acceptable connectivity for data communication with server 108.

The present invention may be implemented in any mobile computing device such as a smartphone, tablet, laptop computer, wearable device or the like. The present methodologies described herein are fully intended to be operable on a variety of devices. Any hardware platform suitable for performing the methodologies described here is suitable for use with the invention. Computer-readable storage media refer to any medium or media that participate in providing instructions to a CPU for execution. Such media can take many forms, such as but not limited to, non-volatile and volatile media including optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for switching between data connections for a mobile communication device, the method comprising the steps of:
    establishing via a cellular network, a cellular data connection between the mobile communication device and a server;
    establishing via a Wi-Fi network, a Wi-Fi data connection between the mobile communication device and the server;
    concurrently maintaining the cellular data connection and the Wi-Fi data connection;
    collecting monitoring data by concurrently monitoring a first ping of the cellular data connection and a second ping of the Wi-Fi data connection, the first ping and the second ping each being a weighted average of a series of ping values;
    using one of the cellular data connection and the Wi-Fi data connection for data communication with the server at any one time;
    collecting switching data, the switching data indicative of a frequency of switching;
    determining at a predetermined time based on the monitoring data whether switching should be performed;
    determining based on the switching data whether switching should be performed by evaluating if the frequency of switching over a time period is within a switching threshold, wherein determining that based on the switching data that switching should not be performed will override any determination for switching made in relation to the monitoring data; and
    if it is determined that switching should be performed, performing switching to switch from the one of the cellular data connection and the Wi-Fi data connection, to another one of the cellular data connection and the Wi-Fi data connection, for data communication with the server.

2. The method of claim 1 wherein if the monitoring data indicates that the first ping is larger than a high ping threshold, and that the second ping is less than the high ping threshold, and that a difference between the first ping and the second ping is larger than a ping-delta threshold, it would be determined that based on the monitoring data, switching should be performed, and switching is performed to switch from the cellular data connection to the Wi-Fi data connection for data communication with the server.

3. The method of claim 1 wherein if the monitoring data indicates that the second ping is larger than a high ping threshold, and that the first ping is less than the high ping threshold, and that a difference between the first ping and the second ping is larger than a ping-delta threshold, it would be determined that based on the monitoring data, switching should be performed, and switching is performed to switch from the WiFi data connection to the cellular data connection for data communication with the server.

4. The method of claim 2 wherein the high ping threshold is a ping value in the range of 100 to 300 ms; and wherein the ping-delta threshold is a ping value in the range of 50 to 70 ms.

5. The method of claim 1 wherein if the monitoring data indicates that the first ping is larger than a severe ping threshold, and that the second ping is less than the first ping, it would be determined that based on the monitoring data, switching should be performed, and switching is performed to switch from the cellular data connection to the Wi-Fi data connection for data communication with the server.

6. The method of claim 1 wherein if the monitoring data indicates that the second ping is larger than a severe ping threshold, and that the first ping is less than the second ping, it would be determined that based on the monitoring data, switching should be performed, and switching is performed to switch from the Wi-Fi data connection to the cellular data connection for data communication with the server.

7. The method of claim 5 wherein the severe ping threshold is around 350 ms.

8. The method of claim 1 wherein the data communication with the server is for the purposes of playing an online game on the mobile communication device, and wherein if the switching data indicates that the frequency of switching for a session of the online game will exceed a game session switching threshold, it would be determined that based on the switching data, switching should not be performed, and switching is not performed.

9. The method of claim 1 wherein the monitoring data is collected by sending heartbeat packets to the server.

10. The method of claim 1 wherein the cellular data connection is assigned a first port number and a first IP address, and the Wi-Fi data connection is assigned a second port number and a second IP address; and switching being performed results in assigning the second port number and the second IP address to the cellular data connection, and assigning the first port number and the first IP address to the Wi-Fi data connection.

11. A mobile communication device comprising:
a cellular module configured to establish via a cellular network, a cellular data connection with a server;
a Wi-Fi module configured to establish via a Wi-Fi network, a Wi-Fi data connection with the server;
a monitoring module configured to collect monitoring data by concurrently monitoring a first ping of the cellular data connection and a second ping of the Wi-Fi data connection, the first ping and the second ping each being a weighted average of a series of ping values;
a communication module configured to use one of the cellular data connection and the Wi-Fi data connection for data communication with the server at any one time; and
a switching module configured to collect switching data, the switching data indicative of a frequency of switching;
wherein the cellular data connection and the Wi-Fi data connection are concurrently maintained; and
wherein the switching module is configured to:
determine at a predetermined time based on the monitoring data whether switching should be performed;
determine based on the switching data whether switching should be performed by evaluating if the frequency of switching over a time period is within a switching threshold, wherein determining that based on the switching data that switching should not be performed will override any determination for switching made in relation to the monitoring data;
and if it is determined that switching should be performed, perform switching to switch from the one of the cellular data connection and the Wi-Fi data connection, to another one of the cellular data connection and the Wi-Fi data connection, for data communication with the server.

12. The mobile communication device of claim 11 wherein if the monitoring data indicates that the first ping is larger than a high ping threshold, and that the second ping is less than the high ping threshold, and that a difference between the first ping and the second ping is larger than a ping-delta threshold; the switching module would determine that based on the monitoring data, switching should be performed and switch from the cellular data connection to the Wi-Fi data connection for data communication with the server.

13. The mobile communication device of claim 11 wherein if the monitoring data indicates that the second ping is larger than a high ping threshold, and that the first ping is less than the high ping threshold, and that a difference between the first ping and the second ping is larger than a ping-delta threshold; the switching module would determine that based on the monitoring data, switching should be performed, and switch from the Wi-Fi data connection to the cellular data connection for data communication with the server.

14. The mobile communication device of claim 11 wherein if the monitoring data indicates that the first ping is larger than a severe ping threshold, and that the second ping is less than the first ping; the switching module would determine that based on the monitoring data, switching should be performed and switch from the cellular data connection to the Wi-Fi data connection for data communication with the server.

15. The mobile communication device of claim 11 wherein if the monitoring data indicates that the second ping is larger than a severe ping threshold, and that the first ping is less than the second ping; the switching module would determine that based on the monitoring data, switching should be performed and switch from the Wi-Fi data connection to the cellular data connection for data communication with the server.

16. The mobile communication device of claim 11 wherein the data communication with the server is for the purposes of playing an online game on the mobile communication device, and if the switching data indicates that the frequency of switching for a session of the online game will exceed a game session switching threshold, the switching module would determine that based on the switching data, switching should not be performed, and switching is not performed.

* * * * *